United States Patent
Bridge, Jr. et al.

(10) Patent No.: US 12,217,550 B1
(45) Date of Patent: Feb. 4, 2025

(54) TOLERATING SERVER FAILURES IN A CONSENSUS PROTOCOL DOWN TO ONE SURVIVING SERVER USING SHARED STORAGE AS A VOTER

(71) Applicant: Oracle International Corporation, Redwood Shores, CA (US)

(72) Inventors: William H. Bridge, Jr., Alameda, CA (US); Yuri Sharonin, Redwood City, CA (US); David Brower, Alamo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/400,999

(22) Filed: Dec. 29, 2023

(51) Int. Cl.
| G07C 13/00 | (2006.01) |
| G06F 11/18 | (2006.01) |
| G06N 20/00 | (2019.01) |
| H04L 9/06 | (2006.01) |
| H04N 21/475 | (2011.01) |

(52) U.S. Cl.
CPC ............ *G07C 13/00* (2013.01); *G06F 11/187* (2013.01); *G06N 20/00* (2019.01); *H04L 9/0643* (2013.01); *H04N 21/4758* (2013.01)

(58) Field of Classification Search
None
See application file for complete search history.

(56) References Cited

U.S. PATENT DOCUMENTS

2020/0042410 A1\* 2/2020 Gupta ................. H04L 67/1097
2020/0311583 A1\* 10/2020 Manamohan .......... G06N 20/00

FOREIGN PATENT DOCUMENTS

CN 114721789 A \* 7/2022

\* cited by examiner

*Primary Examiner* — Kristy A Haupt
(74) *Attorney, Agent, or Firm* — Hickman Becker Bingham Ledesma LLP; Stephen R. Tkacs

(57) ABSTRACT

An elector is provided using shared storage to allow a cluster of participant nodes to gracefully convert failed voters to non-voters until there are only two voters. The cluster can then tolerate the failure of either of those two remaining participant nodes. A tiny amount of shared storage is used as a voter without an object store. This results in a cluster with only one running node that is an exclusive leader. An exclusive leader is then the only participant node that is a voter, and the exclusive leader can commit log records without replicating them to any other members of the cluster. When there is an exclusive leader, there is only one remaining node with a current copy of the object store.

20 Claims, 5 Drawing Sheets

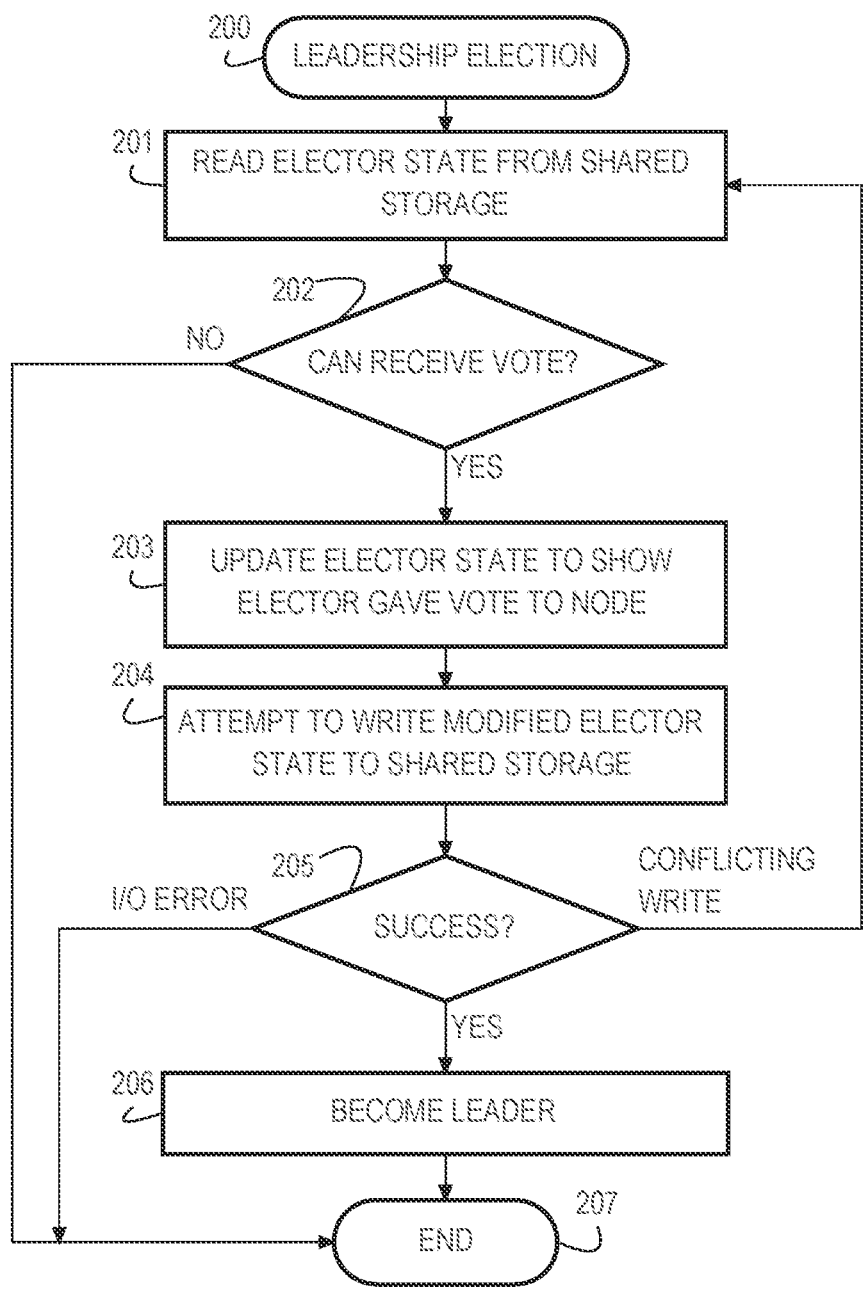

TOLERATING SERVER FAILURES IN A CONSENSUS PROTOCOL DOWN TO ONE SURVIVING SERVER USING SHARED STORAGE AS A VOTER

FIELD OF THE INVENTION

The present invention relates to keeping stable leadership in a consensus protocol and, more particularly, to tolerating server failure down to one surviving server.

BACKGROUND

Consensus protocols allow a collection of machines to work as a coherent group that can survive the failures of some of its members. Because of this, variations of consensus protocols play a key role in large-scale software systems, such as replicated database systems. Raft is a consensus protocol that is designed to be understandable and simple to implement. Raft offers a generic way to distribute a state machine, or object store, across a cluster of servers or computing nodes, referred to herein as simply "nodes" or "participant nodes," ensuring that each node that is a member of the cluster agrees upon the same series of state transitions. The replicated state machines are typically implemented using a replicated log. Each node stores a log replica containing a series of commands, which its state machine executes in order; thus, each state machine processes the same sequence of commands. Since the state machines are deterministic, each computes the same state and the same sequence of outputs.

Consensus protocols such as Raft exchange messages to reliably replicate data on a group of nodes. The leader node makes all changes and generates a log of the changes. The other nodes receive a copy of the log and apply the changes to their replica of the data. The data must be persisted on a majority of servers to be committed. The leader is elected by a majority of the voters. In an example implementation of dynamic voting, when a leader sees that a follower has failed, the leader makes a new voter configuration without the failed follower as a voter. The new voter configuration is used as soon as it is locally persisted and before it is committed. However, there are circumstances where it may be desirable to continue running with only one node to maintain availability of the service. This is particularly true for applications where two replicas of the data are considered adequate.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 is a flowchart illustrating operation of an elector giving or denying a vote to a node in a leadership election in accordance with an illustrative embodiment.

DETAILED DESCRIPTION

Figure 1A:
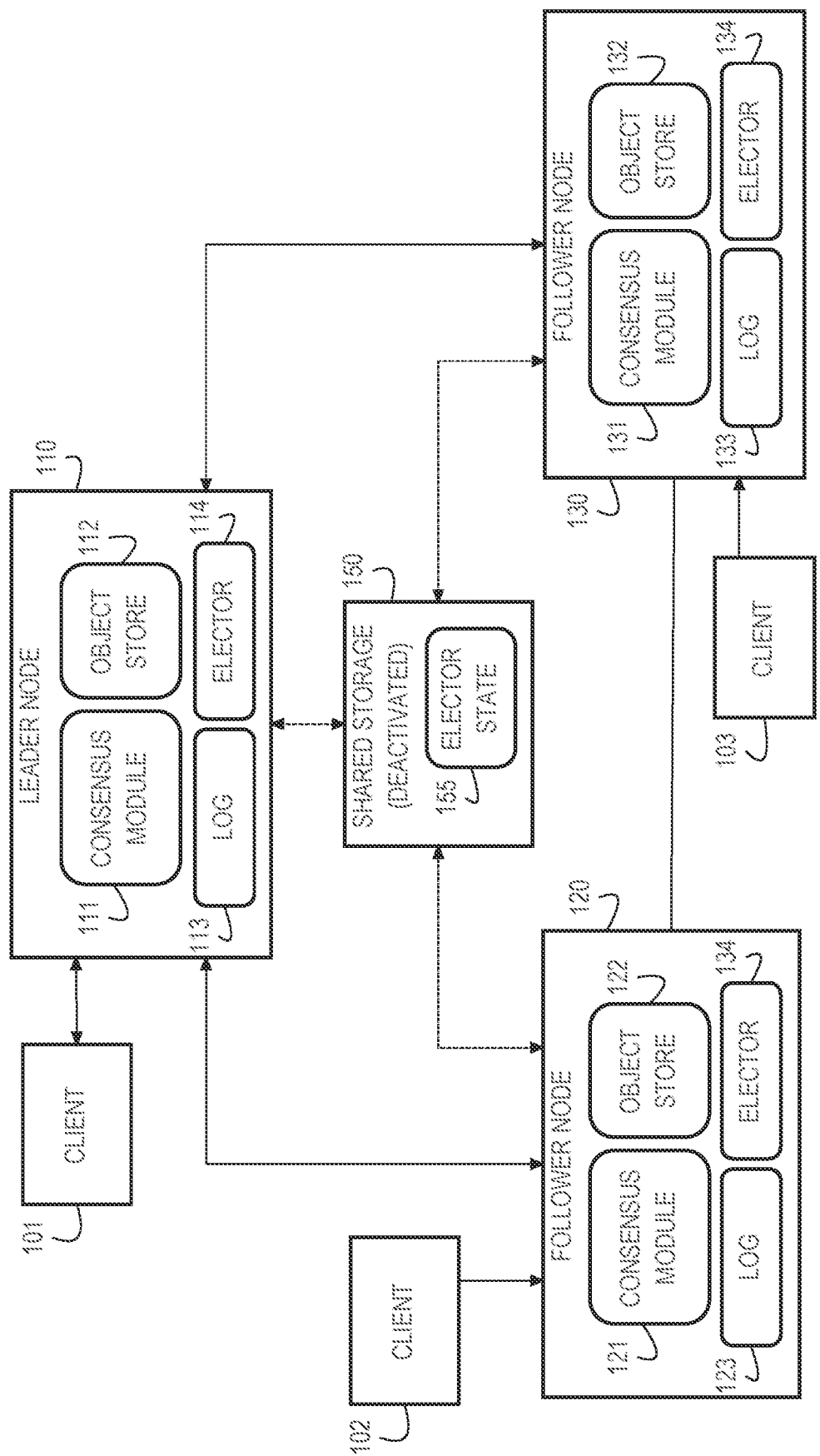
FIG. 1A is a block diagram illustrating a distributed computing system with an object store and log replicated across a plurality of computing nodes in accordance with a consensus protocol in which aspects of the illustrative embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments allow a cluster of participant nodes to gracefully convert failed voters to non-voters until there are only two participant nodes. The cluster can then tolerate the failure of either of those two remaining nodes. This is accomplished by providing a tiny amount of shared storage that, in effect, is used as a voter in leadership elections but does not participate in replication of the log. In the illustrative embodiments, there are two kinds of voters, those that vote in elections and those that also vote to commit log records. An elector votes in leadership elections but does not vote to commit log records. Thus, there is a commit quorum and an elect quorum. When running with an exclusive leader and an active elector, elect quorum is two and commit quorum is one.

This allows a cluster to have only one running node that is an exclusive leader for committing changes to data. An exclusive leader is then the only participant node that is a voter for committing log records, and thus the exclusive leader can commit log records without replicating them to any other members of the cluster. When there is an exclusive leader (only one participant node other than the elector), there is only one remaining copy of the object store. Persistent failure of the exclusive leader results in loss of the object store because the exclusive leader is the only node that can be elected leader. This provides a tradeoff between reliability and availability. Note that an elector can fail when there is an exclusive leader, and another elector can be activated to be a voter in elections. Between the time the failed elector is deactivated, and another elector is activated, both commit quorum and elect quorum are one.

Each participant node stores a persistent state for the node including a current term and an identifier of the candidate that received a vote from the node in the current term. In accordance with the illustrative embodiments, the shared storage stores an elector state for the elector such that each node has access to the elector state. An elector module on each node can access the elector state in the shared storage to determine whether the node can receive a vote from the elector during a leadership election. Thus, the elector, as referred to herein, is the elector state, and each node will attempt to control the elector by modifying the elector state to vote for itself. A participant node must have access to the shared storage for the elector module to modify the elector state to set the vote of the elector.

An elector does not keep a log and does not have a log tail but does keep a voting term and index, which are used in deciding to grant a vote by the elector. The voting term and index are updated as follows: the leader sets the voting term and index to the most recently committed term and index when the elector is activated, the node that gets the vote sets the voting term and index to the most recently committed term and index when the elector successfully gives its vote to the node, the leader sets the voting term and index to the new committed term and index when the elector is active and a new term is committed, or the leader sets the voting term and index to the new committed term and index when the elector is active and a new set of voters is committed.

In some embodiments, the shared storage is configured to provide an atomic read-modify-write, which ensures that the elector module from only one participant node can update the elector state for a given leadership election. The elector module attempts to modify the elector state and store the modified elector state in the shared storage. The participant node succeeds in receiving a vote from the elector only if the write to shared storage is successful. A read-modify-write to shared storage is successful if the node can get a vote from the elector, does not get an I/O error, and is not rejected due to another write since this node read the elector state. Any participant node that does not successfully complete the read-modify-write to the shared storage does not receive a vote from the elector for leadership. The node gets a "no" vote from the elector if the elector state shows the reader cannot get the elector's vote or if there is an I/O error. If the read-modify-write by a node fails because there was a conflicting write, the node repeats the process of reading the new elector state and determining whether the node can receive a vote from the elector. Therefore, as long as there is at least one functional node in the cluster and at least one functioning shared storage, there will be an instance of an elector that can vote in a leadership election due to the use of the shared storage.

Raft Protocol

The illustrative embodiments are described with reference to the Raft consensus protocol; however, aspects of the illustrative embodiments can be applied to other consensus protocols, such as Paxos or Zookeeper Atomic Broadcast (ZAB). Raft is a consensus protocol for managing a replicated log. A Raft cluster or group contains several nodes, such as servers. For example, a typical Raft cluster may include five nodes, which allows the system to tolerate two failures. At any given time, each server is in one of three states: leader, follower, or candidate. In normal operation, there is exactly one leader, and all other participant nodes are followers. Followers respond to requests from leaders and candidates. The third state, candidate, is used to elect a new leader. Raft separates the key elements of consensus, such as leader election, log replication, and safety, and enforces a stronger degree of coherency to reduce the number of states that must be considered. The Raft consensus protocol is described in detail in "Consensus: Bridging Theory and Practice," by Diego Ongaro et al. published by Standford University, 2014, which is hereby incorporated by reference as if fully set forth herein.

FIG. 1A is a block diagram illustrating a distributed computing system with an object store and log replicated across a plurality of computing nodes in accordance with a consensus protocol in which aspects of the illustrative embodiments may be implemented. FIG. 1A illustrates a configuration of nodes at a particular point in time at which node 110 is the leader, nodes 120, 130 are followers, and shared storage 150 is configured but is deactivated because there are more than two participant nodes. The node that is the leader will change over time; however, in the configuration shown in FIG. 1A, node 110 is the current leader.

In the example shown in FIG. 1A, there is a leader node 110 and two follower nodes 120, 130; however, the distributed computing system can include other numbers of nodes depending on the configuration or workload. For example, the number of nodes in the group of participant nodes can be scaled up or down depending on the workload or other factors that affect resource usage. Consensus protocols typically arise in the context of replicated object stores. As shown in FIG. 1A, object stores 112, 122, 132 are replicated across a group of computing nodes 110, 120, 130, respectively. Object stores 112, 122, 132 operate to compute the same state and continue to operate even if one or more of the computing nodes 110, 120, 130 are down.

Replicated object stores 112, 122, 132, which are also referred to as replicated state machines, are implemented using replicated logs. Each node 110, 120, 130 stores a log 113, 123, 133, respectively, containing a series of commands that are executed in order by its object store 112, 122, 132. Each log should contain the same commands in the same order, so each object store will process the same sequence of commands. Because the object stores 112, 122, 132 are deterministic, each computes the same state and the same sequence of outputs.

Keeping the replicated log consistent is the purpose of the consensus protocol. The consensus module 111 on a leader node 110 receives commands from clients, such as client 101, and adds them to its log 113. As shown in FIG. 1A, follower 120 receives commands from client 102, and follower 130 receives commands from client 103. In one embodiment, when a follower 120, 130 receives an update request from a client 102, 103, the follower sends a message to leader 110 to update the object store and generate a log record. The leader returns the result of the command to the follower, which in turn returns the result to the client. In an alternative embodiment, leader node 110 handles all client requests, and if client 102 or 103 contacts follower 120 or 130, the follower redirects the client to the leader node 110.

The consensus module 111 of leader node 110 communicates with the consensus modules 121, 131 of the follower nodes 120, 130 to ensure that their logs 123, 133 eventually contain the same requests or commands in the same order, even if one or more nodes fail. Once commands are properly replicated, each node's object store processes them in log order, and the outputs are returned to the client. As a result, the nodes 110, 120, 130 appear to form a single, highly reliable state machine.

The Raft protocol divides time into leadership terms of arbitrary length. Terms are numbered with integers. Each term begins with an election, in which one or more candidates attempt to become leader. Different nodes observe the transitions between leadership terms at different times, and in some situations a node may not observe an election or even entire terms. In the Raft protocol, terms act as a logical clock, and they allow nodes to detect obsolete information, such as stale leaders. Each node stores a currentTerm number, which increases monotonically over time. Current terms are exchanged whenever nodes communicate; if one node's currentTerm value is smaller than another's, then it updates its currentTerm to the larger value. If a candidate or leader discovers that its current term is out of date, then it immediately reverts to the follower state. If a node receives a request with a stale term number, it rejects the request.

Nodes communicate using remote procedure calls (RPCs), and the consensus protocol requires only two types of RPCs. RequestVote RPCs are initiated by candidates during elections, and AppendEntries RPCs are initiated by leaders to replicate log entries and provide a form of heartbeat. In the Raft protocol, RPCs include a term value as an argument. Any RPC with a term value that is less than the receiving node's currentTerm is rejected. This ensures that only AppendEntries RPCs from the current leader are accepted in the current term.

Raft uses a heartbeat mechanism to trigger a leader election. When nodes start up, they begin as followers. A node remains in follower state as long as it receives valid RPCs from a leader or candidate. Nodes in candidate state do not send heartbeats but send RequestVote RPCs. Leaders send periodic heartbeats (e.g., AppendEntries RPCs that carry no log entries) to all followers to maintain their authority. If a follower receives no communication from the leader over a period of time, then it assumes there is no viable leader and begins an election to choose a new leader. A candidate wins an election if it receives votes from a majority, or consensus, of the nodes in the full group for the same term. The majority rule ensures that at most one candidate can win the election for a particular term. Consensus is determined based on the number of voters indicated in a voter configuration (VoterConfig) stored in each node. If the voter configuration indicates there are five nodes, then consensus is three; if the voter configuration indicates there are three nodes, then consensus is two. Once a candidate wins an election, it becomes leader. It then sends heartbeat messages to the other nodes to establish its authority and prevent new elections.

In one embodiment, followers 120, 130 also send heartbeat messages to leader 110. If leader 110 does not receive a heartbeat message from a follower, such as follower 130, then the leader 110 may modify its voter configuration to demote follower 130 to non-voter. In an alternative embodiment, leader 110 may demote a follower, such as follower 130, to non-voter if leader 110 does not receive responses from the follower for a predetermined period of time or a predetermined number of RPCs. There may be situations where a follower may lose communication with the leader and fail to respond to RPCs, such as the leader's heartbeat. If the leader is not sending RPCs, then a follower may lose connection and regain connection several times without the leader or a candidate sending an RPC, which would not affect the consensus protocol. If the leader does not receive a response from a follower, then the leader may assume that the follower is behind and put the follower into catch-up mode. This may be indicated in the voter configuration. In one embodiment, a follower will not be a voter in leadership elections or for committing log records while in catch-up mode. In this case, the follower will be a non-voter and will not count toward consensus for leadership elections or log changes until it can become a full participant.

Once a leader has been elected, such as leader node 110, it begins servicing requests from clients. Each client request contains commands to be executed by the replicated object stores 112, 122, 132. Leader node 110 appends the command to its log 113 as a new entry, then issues AppendEntries RPCs in parallel to each of the follower nodes 120, 130 to replicate the entry. When the entry has been safely replicated, leader node 110 applies the entry to its object store 112 and returns the result of that execution to the client. Each log entry stores a command along with the term number when the entry was received by the leader. The term numbers in log entries are used to detect inconsistencies between logs.

Each log entry also has a term and log index. Leader node 110 keeps track of the highest index it knows to be committed, and it includes that index in future AppendEntries RPCs (including heartbeats) so that the follower nodes 120, 130 eventually learn the highest index for committed log entries. The "log tail" is the last log record that a node has received. Once a follower node 120, 130 learns that a log entry is committed, it applies the entry to its local object sore 122, 132 in log order.

Object stores 112, 122, 132 are the replicas of the data being maintained by participant nodes 110, 120, 130, respectively. In one embodiment, participant nodes 110, 120, 130 may be implementing a DBMS and may manage object stores 112, 122, 132 in the form of tables, objects, documents, etc. For example, participant nodes 110, 120, 130 may be implementing a relational database management system (RDBMS) that manages a collection of tables (or data frames). As another example, participant nodes 110, 120, 130 may be implementing a document DBMS ("DOCS") that manages a collection of JSON objects.

The highest index (log tail) is also used during an election. If a candidate does not have a log tail that is at least as up to date as the log tail of a voting node, then the voting node will not grant its vote for the candidate. If leader node 110 is still operational, then leader node 110 will have the highest log tail, and one or more follower nodes 120, 130 will follow the leader and have a log tail that is less than or equal to the log tail of the leader. However, if leader node 110 fails, then the winner of the election will contain all of the committed records, i.e., those persisted in a quorum of the voting nodes. In some embodiments, a quorum is defined as a majority; however, other techniques for determining a quorum may be used depending upon the implementation. A node with uncommitted log records might be slow to detect the leader failure and, thus, not get elected.

Elector Using Shared Storage

The illustrative embodiments distinguish between the number of voters required for electing a leader (election quorum) and the number of voters required for committing updates (commit quorum). The illustrative embodiments provide an elector using a small amount of shared storage 150 to act as a voter for elections but not for committing changes. Shared storage 150 maintains the same elector state data structure 155 (with some additional information) that a full member uses for voting in an election, but shared storage 150 does not contain any log or object store data. Essentially, the elector acts as a tie-breaking vote when there are two active cluster members. An elector is never active when there are more than two full participant members in the set of voters. An elector is activated, if possible, when the committed set of voters goes from three voters down to two. The elector is deactivated before a third voter is added to the set of voters in the voter configuration.

An implementation of data replication using the Raft consensus protocol is a shared-nothing architecture in which each update to an object store 112, 122, 132 is satisfied by a single node 110, 120, 130, respectively, in the cluster. The changes are replicated using messaging (e.g., remote procedure calls (RPCs)). The intent is to eliminate contention among nodes. Nodes do not share the same memory or storage. Shared-nothing (SN) architecture eliminates single points of failure, allowing the overall system to continue operating despite failures in individual nodes and allowing individual nodes to upgrade hardware or software without a system-wide shutdown. A shared-nothing system can scale simply by adding nodes.

The illustrative embodiments provide an exception to the shared-nothing architecture by providing shared storage 150, which is accessible by all nodes 110, 120, 130. However, shared storage 150 provides an atomic read-modify-write so that only one participant node can update election state 155 in an election. Shared storage 150 is allocated when an elector is configured and freed when the elector is de-configured. Shared storage 150 provides the ability to read the current contents of the storage and write new contents. In some embodiments, shared storage 150 provides a compare-and-swap style of update to atomically replace the contents (elector state 155) of the storage after checking the previous version for being the same version that was previously read. If two nodes simultaneously attempt an update, one will succeed and the other will get an error on the write. There are several ways the atomic read-modify-write can be implemented. In one example implementation, an algorithm similar to Disk Paxos can be used to implement the shared storage with read-modify-write on plain storage. In another example implementation, a small server accessible over a network, with 512 bytes of persistent storage for example, can implement an atomic read-modify-write of the persistent data using a version number. The version number is returned with the read and passed back with the write to ensure that the shared storage has not been written since the read.

The elector is also implemented using an elector module 114, 124, 134 running in each participant node 110, 120, 130 of the cluster. When a given participant node initiates an election, the elector module on that node accesses shared storage 150, determines whether the given participant node can receive a vote from the elector, and if so, attempts to modify the elector state data structure 155 in shared storage 150 to get the vote of the elector.

As shown in FIG. 1A, shared storage 150 is configured but is not active because there are three participant nodes 110, 120, 130. In an example implementation, the elector is not active if there are more than two members. This prevents a "split brain" scenario in which there are two leaders. Thus, in the example shown in FIG. 1A with three full members, the elector (shared storage 150) is deactivated. Nodes 110, 120, 130 may access shared storage 150 to ensure it is functional; however, the elector associated with shared storage 150 (the elector state 155) will not be designated as a voter in a leadership election in the voter configuration. In one embodiment, multiple electors are configured to tolerate failure of an elector, but only one elector can be active at the same time.

Cluster Member Metadata and Contents of Shared Storage

In accordance with one example implementation, each node in the cluster stores state information including the following:

clusterID: A unique identifier of the cluster to which the node belongs.
memberID: A unique identifier of the node.
currentTerm: The latest term the node has seen (initialized to zero on first boot, increases monotonically).
votedFor: Candidate identifier that received a vote by the node in the current term (or null if none).
log [ ]: Log entries; each entry contains a command for the object store and a term when the entry was created or received from the leader.
commitIndex: Index of highest log entry known to be committed (initialized to zero, increases monotonically).
lastApplied: Index of highest log entry applied to object store (initialized to zero, increases monotonically).

A RequestVote RPC has the following arguments:
term: The candidate's current term.
candidateID: The candidate that is requesting the vote.
lastLogIndex: The index of the candidate's last log entry.
lastLogTerm: The term of the candidate's last log entry.

Each node receiving the RequestVote RPC compares the term value in the RequestVote RPC to its currentTerm value. The node will not grant the vote for the candidate if the term is less than the currentTerm. The node also analyzes the lastLogIndex, and if the candidate's log is not at least as up to date as the receiver's log, then the receiving node does not grant the vote for the candidate.

Shared storage 150 stores an elector state data structure similar to the state information maintained by the participant nodes for electing a leader. The elector state in the shared storage includes the following:

clusterID: A unique identifier of the cluster to which the elector belongs.
memberID: A unique identifier of the elector.
seqnum: A sequence number that is incremented every time a new version of the elector state is written to shared storage.
timestamp: A timestamp that is updated on every write as diagnostic data.
highTerm: The highest term the elector has ever seen. It is updated from the term of the participant node that last updated the elector state. This is used when deciding if this elector will vote for a participant node when it asks for the elector's vote.
votedFor: If the elector voted for a member in highTerm, votedFor will be the memberID of the member receiving the vote; otherwise, it is set to NoMember. This will always be the memberID of a participant node. An elector never receives a vote because it cannot be a leader or candidate.
exclusive LeaderID: The memberID of the participant node that is the exclusive leader. If there is only one participant node in the cluster, then exclusiveLeaderID is set to the memberID of the participant node that is the leader; otherwise, it is set to NoMember. The use of the exclusiveLeaderID is described below.
votingLRID: This log record identifier (LRID) is used as the tail LRID for the elector when checking for the elector's vote in an election.

The above is a non-exclusive list. More or fewer attributes may be stored in the elector state depending on the implementation.

Because an elector does not have a log, the elector will not have a lastLogIndex (or log tail); rather, the elector keeps track of highTerm and votingLRID, which are updated when: set to the most recently committed term and index, when the elector is activated, set to the most recently committed term and index when the elector successfully gives its vote to a node, set to the new committed term and index when the elector is active and a new term is committed, or set to the new committed term and index when the elector is active and a new set of voters is committed. The elector will not vote for a node with a log tail (lastLogIndex) that is lower than votingLRID. When a voter configuration is committed, votingLRID is updated to the LRID of the voting configuration. It is initialized to the current committed LRID when configuring an elector.

Redundant Electors

In some embodiments, multiple instances of shared storage 150 are configured to tolerate failure of an elector. Only one instance of shared storage 150 (elector) can be active at a given time. In one embodiment, while an elector is active, leader node 110 attempts to change a sequence number, timestamp, and voting log record ID (seqnum, timestamp, and votingLRID) in active shared storage 150 to ensure the shared storage is working properly. In one embodiment, the leader attempts to update every configured elector, not just the active elector. This is to discover failed storage before attempting to use it. The votingLRID is advanced to the current committed LRID.

If votingLRID gets a new term that is greater than highTerm, then the leader advances highTerm and clears votedFor. This is only called in the leader, so it normally does not conflict with another update; however, it can conflict if there is another member that believes it is the leader. Additionally, nodes 120, 130 may also attempt to access shared storage 150 periodically to ensure it is working properly. In one embodiment, other nodes only read the shared storage to ensure it is working properly; however, in other implementations, the other nodes may also attempt to write to shared storage.

If leader node 110 attempts to change the sequence number in shared storage 150 and fails, then leader node 110 may assume that the shared storage 150 is not functional or reachable, in which case, leader node 110 may change the voter configuration to use a different shared storage as the elector. If an elector fails while it is a voter in leadership elections, the leader marks it as unhealthy and removes it from the voter configuration. If another elector is available, the leader adds it to the voter configuration as soon as the voter configuration without an elector is committed. Before being added to the voter configuration, the elector is updated to have the current elector state including the exclusive leader, if any.

Each configured shared storage 150 must store a valid elector state data structure 155. In one embodiment, leader node 110 initializes a shared storage 150 with a default elector state. Alternatively, leader node 110 can store the modified elector state that was stored locally as the elector state 155. If a node did become leader by receiving a vote from the elector, then the node has stored locally the copy of the modified elector state that the node stored in the shared storage to receive the vote of the elector.

Configuring a new elector is handled in the same way as adding or removing a cluster member, by the leader altering the voter configuration. The leader changes the voter configuration and creates a log record to replicate the voter configuration to the other nodes. Thus, each node stores a voter configuration; however, the voter configuration may be different at each node depending on whether the most recent voter configuration has been replicated to each node.

Failing Down to One Full Cluster Member

The voter configuration lists the nodes that participate in a leadership election and the nodes that participate in committing log records. When there are only two full participants in the voter configuration, they both must persist a log record for it to be committed. Thus, all committed updates are in both the leader and the follower. This includes the activation and deactivation of the elector. When there are two full participant nodes, either node can become the exclusive leader without losing any committed updates. The elector read-modify-write update ensures only one of them can become the exclusive leader.

An elector is a cluster member that is in role "elector." An elector is added and dropped like any other cluster member. It can be specified at founding or added later using an add-member request. A shared storage adaptor must be configured to provide a means of constructing one or more instances of the elector, i.e., the shared storage. A connect string may be used by the shared storage adaptor to allocate or find the shared storage for the elector to use. Activating an elector does not change the quorum for committing an election or committing log records but can change the quorum for electing a leader.

Elector support requires some changes to the voter configuration. Because an elector is a voter, the voter configuration has an entry for the elector if it is an active voter. It is necessary to have a means of distinguishing an elector from a voter that is a full participant cluster member. Only one elector can appear in a voter configuration and only when the number of full members is one or two. When constructing a cluster, there could be only one cluster member, which would be the exclusive leader. If there are any electors configured, then one will be activated to be part of the initial voter configuration. This allows the cluster to fail down to an exclusive leader if a second member fails as soon as it is added to the voter configuration.

An election is initiated if a participant node determines that an election timeout expires without receiving a heartbeat (an AppendEntries RPC) from the current leader. This may happen due to failure of the leader or because of network partitioning in which both the follower and the leader are functional but cannot communicate with each other. That participant node then converts to candidate, increments its currentTerm, votes for itself, and issues a RequestVote RPC to the other nodes in the cluster. An election may be initiated in other circumstances, such as an election that is forced from an entity outside the cluster, for example.

In the configuration shown in FIG. 1A, there are three possible scenarios for an election: (1) temporary communication failure between the candidate and the leader, (2) network partitioning of the candidate, or (3) failure of the leader. In the first scenario, the follower node will perceive that the leader failed because of an election timeout, become a candidate, and start an election; however, the leader will deny the vote by the candidate if communication has been restored prior to the candidate issuing the RequestVote RPC and the other follower will also deny the election. Thus, the candidate will only receive a vote from itself. In the second scenario, the candidate will likely only receive a vote from itself, because the RequestVote RPC will not be received by the other nodes. In the third scenario, both followers will become candidates and start a leadership election, and the candidate with the most up-to-date log will win the election. All three scenarios can be resolved without a vote from the elector; therefore, the elector, i.e., shared storage 150, is deactivated in FIG. 1A. If there are three full cluster members providing a heartbeat successfully, then there is no active elector, and the elector cannot vote for leadership election. The elector can be a voter only when the number of full members is one or two (and only for leadership elections).

Figure 1B:
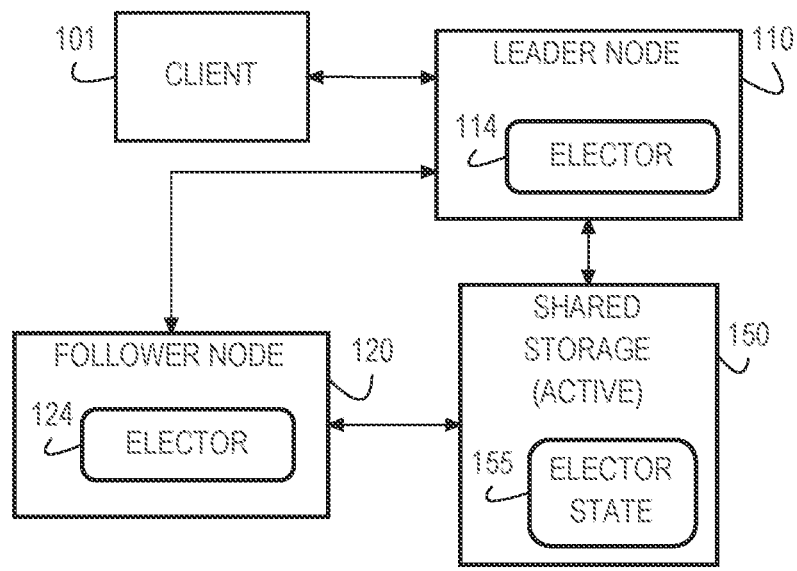
FIG. 1B is a block diagram illustrating a distributed computing system with two participant nodes and an elector in accordance with an illustrative embodiment.

FIG. 1B is a block diagram illustrating a distributed computing system with two participant nodes and an elector in accordance with an illustrative embodiment. In the example shown in FIG. 1B, follower node 130 has failed, and leader node 110 and follower node 120 remain in the cluster. The voter configuration has been updated to indicate two participant members (leader 110 and follower 120) and to indicate that the elector is given the role of voter for electing a leader. The elector does not vote for committing updates, because the elector does not have a log or object store. This allows one of the nodes to become the leader by voting for itself and getting a vote from the elector by calling its elector module 114, 124 to read elector state 155 from shared storage 150, modifying the elector state locally, and performing a read-modify-write to write the modified elector state to shared storage 150. An election is successful, and the candidate becomes leader, only if the candidate receives votes from a majority of voting members. In a cluster of two nodes, the elector provides a vote to allow a candidate to receive a majority of votes when the other node has failed.

When going from three participant nodes to two full participant nodes, the voter configuration is constructed with the two full cluster members and the elector as a voter in leadership elections. This must be done in two steps. First, the failed voter is removed from the voter configuration, and that configuration is committed by both nodes. Then, a voter configuration with the elector as a voter in elections is created and committed. Changing the voter configuration with two participant nodes requires both members to persist the voter configuration to commit it. Once the cluster has committed with the voter configuration having two participant nodes plus an elector, either of the participant nodes can be elected as exclusive leader. A node can be elected with a vote for itself and a vote from the elector.

Again, there are three possible scenarios for an election: (1) temporary communication failure between the follower and the leader, (2) network partitioning of the candidate, or (3) failure of the leader. In the first two scenarios, the follower node 120 will perceive that the leader failed because of an election timeout. The follower will convert to candidate, increment its currentTerm, vote for itself, reset the election timer, and send a RequestVote RPC to the leader 110. The candidate will also call elector module 124 to perform a read-modify-write of shared storage 150 to attempt to receive a vote from the elector. If the leader has received the elector's vote and performed an update of elector state 155), then the candidate will not receive the vote from the elector. If the candidate does receive the vote from the elector, then node 120 becomes the leader and node 110 reverts to follower.

In the third scenario, node 120 starts an election and calls elector module 124 to perform a read-modify-write of shared storage 150 to attempt to receive a vote from the elector. Because the leader failed, the node 120 receives a vote from itself and the elector. In this case, node 120 becomes the leader, and node 110 reverts to follower. Since an elector can only vote in an election when elect quorum is two, getting a vote from the elector always results in the node becoming leader.

If another node is added to the voter configuration as a full participant, then the shared storage 150 is deactivated, and the configuration returns to that of FIG. 1A. The elector is deactivated after a third member has caught up and before the third member is added to the voter configuration. In a typical implementation, Raft only allows one change in voters at a time; therefore, in one implementation, the elector must be deactivated prior to the voter configuration with the third full cluster member being committed. This is done automatically as soon as the new voter configuration commits. There is a window after the elector is deactivated when the voter configuration has only nodes 110 and 120 with no active elector. During this brief window, an exclusive leader cannot be elected.

Figure 1C:
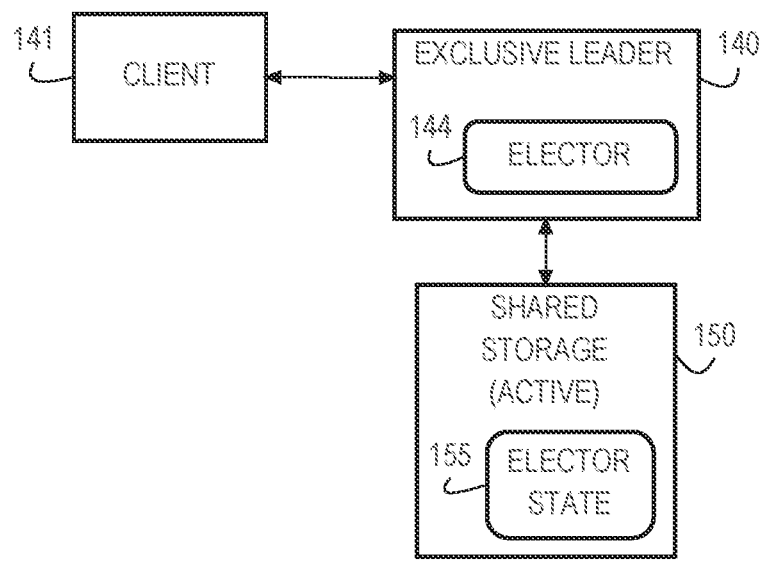
FIG. 1C is a block diagram illustrating a distributed computing system that has failed down to a single participant node in accordance with an illustrative embodiment.

FIG. 1C is a block diagram illustrating a distributed computing system that has failed down to a single participant node in accordance with an illustrative embodiment. In the example shown in FIG. 1C, either follower node 120 has failed and leader node 110 becomes exclusive leader 140, or leader node 110 has failed and follower node 120 becomes exclusive leader. The voter configuration has been updated to indicate one participant member, to indicate that the elector is given the role of voter for electing a leader, and to indicate that node 140 is the exclusive leader. This voter configuration can be committed by exclusive leader 140 alone because the commit quorum is now one.

When an election is won with an elector and the remaining node voting for itself, then a new voter configuration with only the local member and the elector as voters is included in the log recorded committing the election. Similarly, if the leader marks the only follower as being in catch-up, then a new voter configuration with the current leader as the exclusive leader is added to the log record. The voter configuration will also contain the elector as a voter in leadership elections. Commit quorum becomes one and elect quorum stays at two (the leader and the elector). When the follower is elected as exclusive leader, the exclusiveLeaderID field is set before the new voter configuration is committed. When the follower does not get heartbeats from the leader, it gets its own vote and then tries to get the elector's vote. The follower then tries to update the elector state to set the follower's MemberID as the exclusive leader and record the vote for the follower in highTerm and votedFor. If successful, the follower then becomes the exclusive leader even though the voter configuration has not been updated. It then proceeds to make a voter configuration designating itself as the only committer by removing the old leader. The node then commits the voter configuration by persistently appending the voter configuration to its log. When a member restarts and finds an elector in its voter configuration, it reads the elector state. If the node sees that it is the exclusive leader, the node will ensure the voter configuration reflects that state.

When the leader fails to get heartbeats from the follower, it sets itself as the exclusive leader in the elector state without running an election. If the follower already got the elector's vote, this would fail, and the leader steps down from leading. After successfully updating the elector, a new voter configuration without the follower is created. The elector will not vote for any node other than the exclusive leader unless exclusiveLeaderID is set to NoMember. The concern is that the follower or the member that lost the election could start a higher term and use the elector to become exclusive leader. If the exclusive leader has to deactivate the elector and activate another, the new elector will have the exclusiveLeaderID set. When a voter configuration with two voting participant nodes is committed, this will go back to being NoMember.

Going from one exclusive leader with an elector back to two participant nodes with an elector is simply a matter of creating and committing a new voter configuration by persisting the voter configuration with the two participant members. If the leader sees three full members heart-beating and the voter configuration contains an elector, then the leader submits a request to deactivate the elector. Going to three participant nodes without an elector starts by first deactivating the elector by committing a voter configuration with just the two full participants as voters in leadership elections and then adding the new cluster member to the voter configuration and committing the voter configuration with three participant nodes and an elector.

As an example of failing down to one leader, consider a three-member cluster with one elector (deactivated) and no hardware failures. The member nodes are M1, M2, M3 (with M1 as leader) and the elector is E4. The initial voter configuration is VC1={M1, M2, M3}. In one embodiment, when dynamic voting is enabled, if M3 stops providing a heartbeat, it will be removed from the voter configuration, resulting in the following voter configuration is committed: VC2={M1, M2}. If there is an elector E4, then VC3={M1, M2, E4} is created. Once VC3 exists, failure of M2 results in M1 becoming exclusive leader, e.g.: VC4={M1, E4}. Before M1 constructs VC4, it attempts to update E4 to have M1 as the exclusive leader. If M1 fails, it steps down from leadership and starts an election. Note that VC3 does not need to be committed before VC4 is committed since M1 commits VC3 as a side effect of persisting VC4 because commit quorum is one.

If M2 restarts and catches up its log to M1's log, then VC5={M1, M2, E4} is created. When M1 sees that VC5 is persisted by both M1 & M2, but before advancing the committed LRID, M1 clears the exclusive leader MemberID in the Elector state of E4. It then advances the committed LRID. If M1 or M2 crashes before the elector is updated, M1 is the only one that can be leader because E4 will only vote for the exclusive MemberID in its elector state, which is M1. After M1 restarts it becomes the leader and again clears the exclusive MemberID from E4 before advancing the committed LRID.

When M3 restarts and catches up to the current leader's committed LRID, then VC6={M1, M2} is created. VC6 must be committed before V7={M1, M2, M3} can be created. This ensures M2 has VC6 as its current VC and will not try to get a vote from E4 causing a "split brain" scenario.

Leadership Election Using Elector

FIG. 2 is a flowchart illustrating operation of an elector giving or denying a vote to a node in a leadership election in accordance with an illustrative embodiment. Operation begins when a full participant node initiates a vote for leadership (block 200). The node calls the elector module to read the elector state from shared storage (block 201) and determines whether the node can receive a vote from the elector based on the current elector state (block 202). This is a pre-vote determination of whether the node can receive a vote from the elector. The read operation will return an error if the shared storage is inaccessible or if the elector state data structure is corrupt, in which case, the node cannot receive a vote from the elector. The first and most important check is to verify that the exclusiveLeaderID is zero or this node's MemberID. No matter what the other fields contain, if there is a non-zero exclusiveLeaderID that is not this node's MemberID, then that node is the exclusive leader until it clears the exclusiveLeaderID to zero.

If the node's local current term (currentTerm) is less than the high term (highTerm) in the elector state, then node cannot receive a vote from the elector because the node is behind the other nodes. If the node's local currentTerm is equal to the highTerm in the elector state, then the elector has already voted for another node in this term and the node will not receive a vote from the elector. If the node's local currentTerm is greater than highTerm in the elector state, then the elector module advances highTerm to currentTerm and clears the votedFor attribute in the modified elector state stored locally in the node, because any votedFor value will be for a previous term. Note that currentTerm was just incremented as part of the requesting member going into the candidate state. If the local logTail of the candidate is less than votingLRID in the elector state (the index of the last election the elector voted in), then the elector module sets the return value to an error, indicating the candidate cannot receive a vote from the elector. If votedFor in the elector state is zero, the candidate sets the votedFor attribute to the node's memberID in the modified elector state. If votedFor is equal to the memberID of the node, then the elector module sets the return value to success to indicate that the node can receive the vote from the elector.

The pre-vote determination could fail if the elector already voted for another member, the node's log is not up to date, there is an error reading shared storage, or the elector state is corrupt. In one embodiment, when the elector state is successfully read, the node determines it can receive a vote from the elector if the following expression is true:

currentTerm+1>=highTerm &&
 tailLRID>=votingLRID &&(currentTerm+
 1>highTerm||votedFor==0||votedFor==
 memberID)

where currentTerm is the local term of the node, tailLRID is the log record ID of the last log record in the node's log, memberID is the local member ID of the node, and highTerm, votingLRID, and votedFor are fields in the elector state data structure. If the node cannot get a vote from the elector (block 202: NO), then operation ends (block 207).

If the node can receive a vote from the elector (block 202: YES), then the node updates the elector state that was read from shared storage to indicate that the elector gives a vote to the node (block 203). The node calls the elector module to attempt to write the modified elector state to the shared storage (block 204). The write to shared storage is performed as an atomic read-modify-write. The node must first determine whether the shared storage has not been modified by another node in the meantime. Writing the modified elector state to shared storage can fail for a few reasons: there is an I/O failure reading or writing the shared storage, reading the shared storage shows the elector gave its vote to another node, reading the shared storage shows this node does not have a sufficiently current voter configuration, or another node has written to the shared storage after the candidate node read the elector state in block 201.

The node determines whether the write to shared storage succeeds (block 205). If the write fails due to a conflicting write (block 205: CONFLICTING WRITE), then operation returns to block 201 to read the elector state from shared storage and attempt to get a vote from the elector. The node repeats attempting to get a vote from the elector until either the node determines that it cannot get the vote from the elector (block 202: NO), the node succeeds in writing the modified elector state to shared storage and gets the vote from the elector (block 205: YES), or the write fails due to an I/O error (block 205: I/O ERROR). Note that the elector is only active if the number of full cluster members is one or two. If the number of full cluster members is one, then the node will always get the vote from the elector. If the number of full cluster members is two, then election quorum is two and the node that receives the vote from the elector will win the election and become leader. After a successful read-modify-write of the modified elector state to the shared storage, the node becomes the leader (block 206), and operation ends (block 207). If the write fails due to an I/O error (block 205: I/O ERROR), then operation ends (block 207).

The node may lose the election if there is a network partition with the other node continuing to service requests from clients. In this case, the candidate node will not be as up to date as the other node and will continue to lose elections until network communication is restored and the node can catch up. If the candidate node loses the election, then the node may subsequently receive an RPC from a leader, in which case the candidate will revert to the follower state.

Exclusive Leader

If there are two full cluster members plus an elector, when either node sees the other member failing to heartbeat, then the node that did not get the expected heartbeat starts an election. Followers normally start an election if they do not get heartbeats from the leader. In one embodiment, with an elector configured, the leader forces an election if the follower does not provide a heartbeat within a predetermined period of time.

With dynamic voting, if there are two voting members and the follower fails to communicate with the leader, the leader can put the follower into catch-up and make itself the exclusive leader. This does not work with an elector configured, because there could be a network partition such that the two members could not communicate with each other, but the follower could access the shared storage. The follower could elect itself as the exclusive leader using the elector. If the leader could become exclusive leader without a vote from the elector, then there could be two leaders. In accordance with one embodiment, if the leader does not receive a heartbeat from the follower, then the leader tries to update the exclusiveLeaderID to its MemberID. If successful, this ensures that the elector will not vote for any other node. The node then proceeds in the normal way to remove the follower from the voter configuration. If the update failed because of an I/O error or because exclusiveLeaderID is not zero, the old leader starts an election that is likely to fail. If the update failed because of an I/O error accessing the elector, then the elector is unavailable, and no progress will be possible until either the follower or elector is available. If the update failed because exclusiveLeaderID was not zero, then another node is the exclusive leader, and will stay exclusive leader until it clears the exclusive LeaderID field.

Note that it is possible for the leader to fail immediately after updating the elector and before updating the voter configuration. In this state no other node can become leader so no progress is possible until the leader restarts. At startup a node starts an election if it times out waiting for a message from the leader. If it sets the exclusive leader, then it will win the election, and complete the transition to exclusive leader.

When the leader is running as an exclusive leader, another full member in catch-up can become a voter. This involves creating a log record that updates the object store and creates a voter configuration with two full members and an elector. There is no problem if the caught-up member fails or is partitioned before it messages the leader that the new log record is persisted. The elector is still configured and can be used to run another election that one of the full members can win. Note that it is possible for the elector that voted for the exclusive leader to fail while the exclusive leader is the only committing member. The leader can deactivate the failed elector and activate another one. The new elector will have the same exclusiveLeaderID.

When a node wins an election and becomes the exclusive leader, then node modifies the elector state to set the exclusiveLeaderID to its own memberID by directly accessing the shared storage. Getting a vote from the elector sets the exclusiveLeaderID along with the votedFor field. After updating the elector to show it voted for the new exclusive leader, a new voter configuration log record is generated with the new exclusive leader as the only full voter and the elector with the exclusive leader set as the active elector. If there is a network partition, there may be another node still running on the other side of the network partition, and that node would not receive a log record to commit the new voter configuration. According to that node's local voter configuration, there are still two full cluster members. However, because the exclusive leader set the exclusiveLeaderID in the elector state data structure, the other node must honor the exclusive leader set in the elector state. If that other node initiates an election and reads the elector state, that node would know that it cannot receive a vote from the elector because the exclusiveLeaderID is set to another node's member ID. The exclusiveLeaderID in the elector state trumps the voter configuration when it comes to whether there is an exclusive leader and who the exclusive leader is. This prevents a situation where there are two nodes who think they are the exclusive leader.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
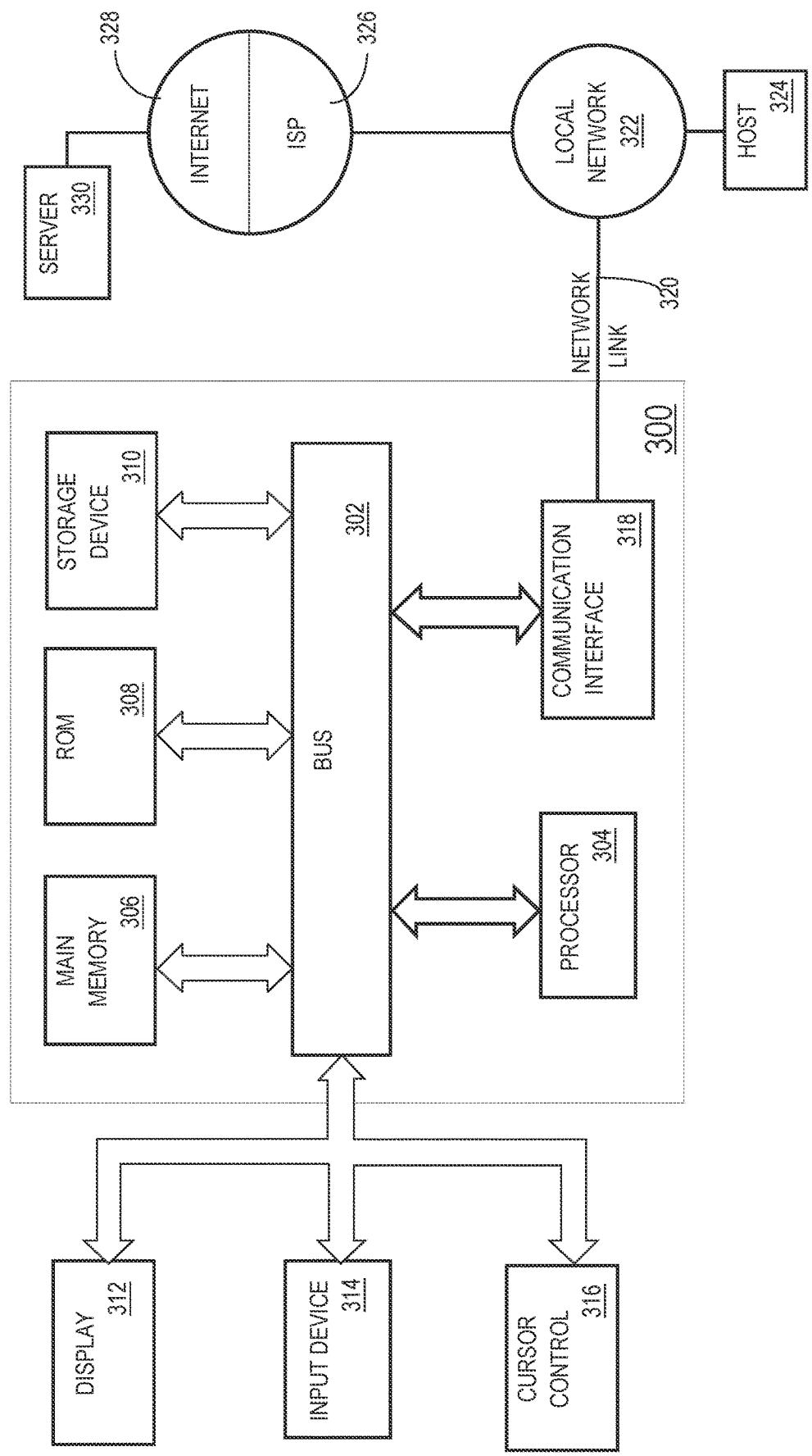
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world-wide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
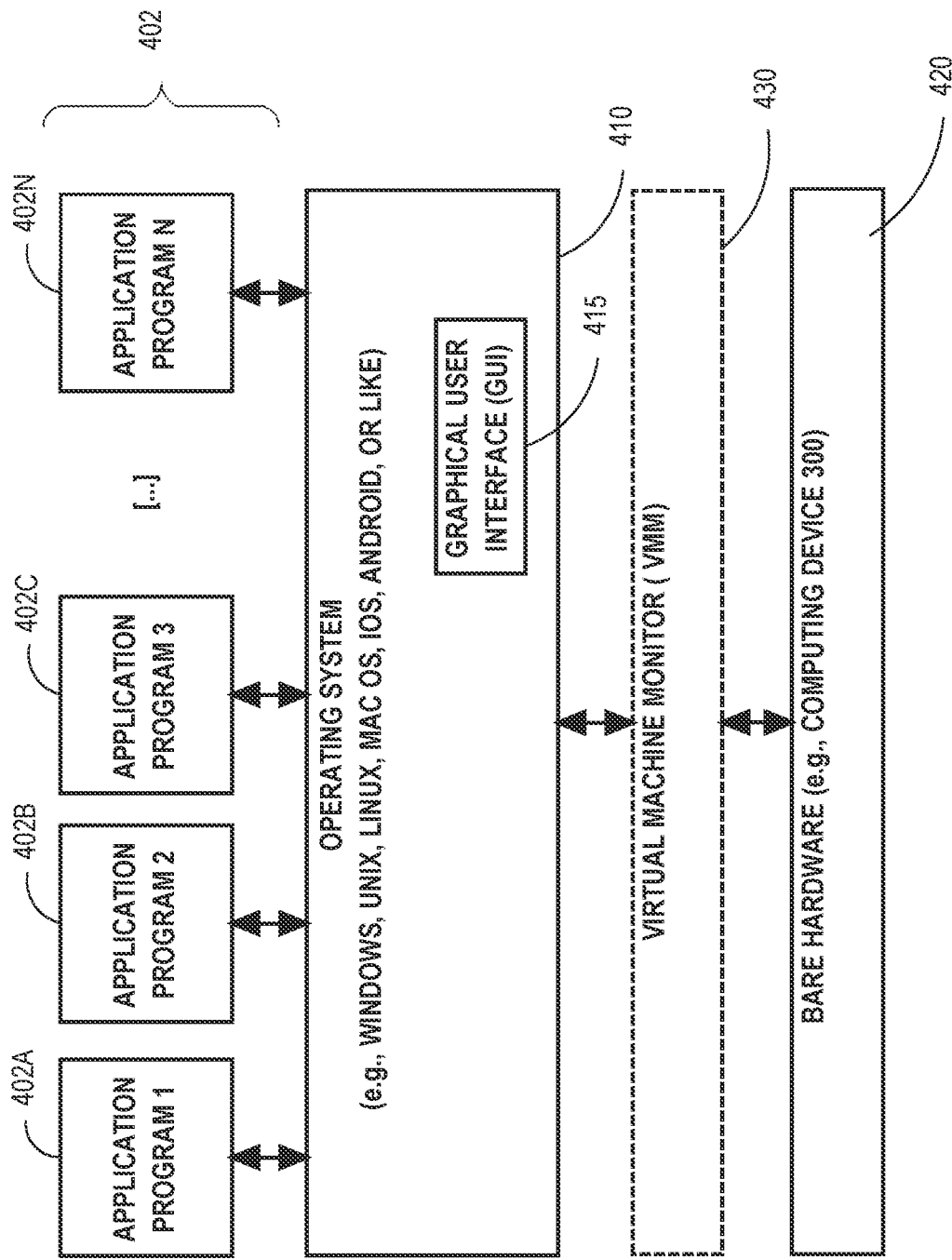
FIG. 4 is a block diagram of a basic software system that may be employed for controlling the operation of a computer system.

FIG. 4 is a block diagram of a basic software system 400 that may be employed for controlling the operation of computer system 400. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    activating an elector in a group of participant nodes, wherein:
        the group of participant nodes includes a leader node and a follower node,
        the leader node is configured to replicate changes to a local object store to the follower node according to a consensus protocol,
        the elector comprises an elector state data structure stored in a shared storage, and
        the shared storage is accessible by each node in the group of participant nodes;
    in response to a request for an election for leadership of the group of participant nodes from a particular participant node from the group of participant nodes, determining, by the particular participant node, whether the particular participant node will receive a vote from the elector based on contents of the elector state data structure;
    in response to determining that the particular participant node will receive the vote from the elector, modifying the elector state data structure in the shared storage based on whether the particular participant node received the vote from the elector; and
    determining a new leader for the group of participant nodes based at least in part on whether the particular participant node received the vote from the elector,
    wherein the method is performed by one or more computing devices.

2. The method of claim 1, wherein the contents of the elector state data structure comprise:
a high term representing a highest term the elector has seen,
a voted-for identifier of a member the elector last voted for, and
a log record identifier representing a log record that committed the last election the elector voted in.

3. The method of claim 2, wherein the particular participant node determines whether the particular participant node will receive the vote from the elector based on a comparison of a current term and the high term, a comparison of a local log tail of the particular participant node and the log record identifier, and a value of the voted-for identifier.

4. The method of claim 3, wherein modifying the elector state data structure comprises:
in response to the current term being greater than the high term, modifying the high term to be equal to the current term to form modified content.

5. The method of claim 2, wherein modifying the elector state data structure comprises:
setting the voted-for identifier to a member identifier of the particular participant node.

6. The method of claim 1, wherein modifying the elector state data structure comprises:
attempting to write the modified elector state data structure to the shared storage;
in response to a failure to write the modified elector state data structure to the shared storage, repeating determining whether the particular participant node will receive a vote from the elector based on contents of the elector state data structure.

7. The method of claim 1, wherein determining the new leader comprises determining consensus between the new leader and the elector.

8. The method of claim 1, wherein the request for the election is initiated by the follower node in response to detecting a failure of the leader node.

9. The method of claim 1, wherein the request for the election is initiated by the leader node in response to downgrading the follower node from a voter role to a non-voter role.

10. The method of claim 1, further comprising designating the new leader as an exclusive leader node that commits updates with a quorum of one.

11. The method of claim 10, wherein modifying the elector state data structure comprises storing an identifier of the new leader as an exclusive leader.

12. The method of claim 1, wherein the shared storage provides atomic read-modify-write such that only one participant node updates the elector state data structure in the shared storage to receive a vote from the elector for the election for leadership.

13. The method of claim 1, wherein activating the elector in the group of participant nodes comprises configuring a plurality of instances of shared storage and activating only one instance of shared storage within the plurality of instances of shared storage to participate in elections for leadership.

14. The method of claim 1, wherein the elector acts as a voter for elections for leadership but not for committing changes to the object store.

15. The method of claim 1, further comprising:
in response to adding a second follower node to the group of participant nodes, deactivating the elector.

16. One or more non-transitory storage media storing instructions which, when executed by one or more computing devices, cause:
activating an elector in a group of participant nodes, wherein:
the group of participant nodes includes a leader node and a follower node,
the leader node is configured to replicate changes to a local object store to the follower node according to a consensus protocol,
the elector comprises an elector state data structure stored in a shared storage, and
the shared storage is accessible by each node in the group of participant nodes;
in response to a request for an election for leadership of the group of participant nodes from a particular participant node from the group of participant nodes, determining, by the particular participant node, whether the particular participant node will receive a vote from the elector based on contents of the elector state data structure;
in response to determining that the particular participant node will receive the vote from the elector, modifying the elector state data structure in the shared storage based on whether the particular participant node received the vote from the elector; and
determining a new leader for the group of participant nodes based at least in part on whether the particular participant node received the vote from the elector.

17. The one or more non-transitory storage media of claim 16, wherein the contents of the elector state data structure comprise:
a high term representing a highest term the elector has seen,
a voted-for identifier of a member the elector last voted for, and
a log record identifier representing a log record that committed the last election the elector voted in.

18. The one or more non-transitory storage media of claim 17, wherein the particular participant node determines whether the particular participant node will receive the vote from the elector based on a comparison of a current term and the high term, a comparison of a local log tail of the particular participant node and the log record identifier, and a value of the voted-for identifier.

19. The one or more non-transitory storage media of claim 18, wherein modifying the elector state data structure comprises:
in response to the current term being greater than the high term, modifying the high term to be equal to the current term to form modified content.

20. The one or more non-transitory storage media of claim 17, wherein modifying the elector state data structure comprises:
setting the voted-for identifier to a member identifier of the particular participant node.

* * * * *